United States Patent
Tsuru et al.

(10) Patent No.: US 6,942,453 B2
(45) Date of Patent: Sep. 13, 2005

(54) TURBINE NOZZLE SEGMENT

(75) Inventors: Atsushi Tsuru, Nishitokyo (JP); Keiji Nishimura, Sayama (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 52 days.

(21) Appl. No.: 10/764,442

(22) Filed: Jan. 27, 2004

(65) Prior Publication Data

US 2004/0213673 A1 Oct. 28, 2004

(30) Foreign Application Priority Data

Apr. 28, 2003 (JP) ........................................ 2003-123923

(51) Int. Cl.$^7$ ................................................ F01D 9/00
(52) U.S. Cl. .................................................. 415/209.4
(58) Field of Search ........................ 415/209.4, 208.2, 415/191, 209.3, 209.2, 189, 190

(56) References Cited

U.S. PATENT DOCUMENTS

| | | | |
|---|---|---|---|
| 2,903,237 A | | 9/1959 | Petrie et al. |
| 4,391,565 A | * | 7/1983 | Speak .......................... 415/189 |
| 4,511,306 A | | 4/1985 | Hultgren |
| 4,553,901 A | * | 11/1985 | Laurello ...................... 415/138 |
| 5,131,813 A | * | 7/1992 | Przytulski et al. .......... 416/217 |
| 5,131,814 A | * | 7/1992 | Przytulski et al. .......... 416/217 |
| 5,232,340 A | | 8/1993 | Morgan |
| 5,249,920 A | | 10/1993 | Shepherd et al. |
| 5,333,995 A | * | 8/1994 | Jacobs et al. .............. 415/209.2 |

FOREIGN PATENT DOCUMENTS

| | | |
|---|---|---|
| JP | 5-26004 | 2/1993 |
| JP | 11-36802 | 2/1999 |

* cited by examiner

Primary Examiner—Edward K. Look
Assistant Examiner—Devin Hanan
(74) Attorney, Agent, or Firm—Oblon, Spivak, McClelland, Maier & Neustadt, P.C.

(57) ABSTRACT

A turbine nozzle segment 1 of a turbine nozzle assembly comprises a plurality of stator vanes 7, an arc-like inner band 9 integrally molded at the inner end of a plurality of the stator vanes 7, an arc-like outer band 11 integrally molded at the outer end of a plurality of the stator vanes 7. An outer band 11 includes an outer platform 19, a forward outer leg 21, a aft outer leg 23 and a hook member 29 formed at the back end and also in the central portion in the circumferential direction of the outer platform 19.

8 Claims, 5 Drawing Sheets

TURBINE NOZZLE SEGMENT

BACKGROUND OF THE INVENTION

1. Field of the Invention

The present invention relates to a turbine nozzle segment composing a part of a turbine nozzle to be installed onto the back of a turbine case of an aircraft engine.

2. Description of the Related Art

In the technical field of aircraft engines, a technique of dividing the turbine nozzle into a plurality of turbine nozzle segments has been widely employed because this enhances the high temperature strength, etc. of the turbine nozzle. Generally, the turbine nozzle segment comprises a plurality of stator vanes, an arc-like inner band integrally molded at the inner end of a plurality of the stator vanes, an arc-like outer band integrally molded at the outer end of a plurality of the stator vanes.

The concrete constitution of the inner band is as follows. An inner platform is formed at the inner end (on the hub side) of a plurality of the stator vanes, and the inner platform has a flange portion protruding inward at its back end and also has an inner flow-path face on its outer side. An inner leg is formed on the inner side of the inner platform, and the inner leg has a support arc at its inner end.

An outer platform is formed at the outer end (on the tip side) of a plurality of the stator vanes, and the outer platform has an outer flow-path face on its inner side. A forward outer leg is formed on the outer side of the outer platform, and the forward outer leg has, at its front end, a forward hook able to fit in an nozzle support hook of the turbine case. A aft outer leg is formed at the back of the forward outer leg on the outer side of the outer platform.

When the turbine nozzle assembly, which comprises a plurality of the turbine nozzle segments with the above constitution, is installed onto the back of the turbine case, the following operation will be performed using a assembly fixture. The assembly fixture is composed of the same number of inner lock pieces and outer lock pieces respectively as that of the turbine nozzle segments. That is to say, a plurality of the turbine nozzle segments are disposed in a circle to configure the turbine nozzle assembly.

By inserting and turning each inner lock piece of the assembly fixture in between the inner platform and the support arc of the turbine nozzle segment corresponding thereto, each inner lock piece is hooked on the flange portion corresponding thereto of the turbine nozzle segment. In a similar manner, by inserting and turning each outer lock piece of the assembly fixture in between the outer platform and the aft outer leg of the turbine nozzle segment corresponding thereto, each outer lock piece is hooked on the vicinity at the back end of the outer platform corresponding thereto of the turbine nozzle segment. Thereby, the turbine nozzle assembly can be temporarily loaded on the assembly fixture.

Then by making the assembly fixture approach to the back of the turbine case, the forward hook of the forward outer leg of each turbine nozzle segment is fit into the nozzle support hook of the turbine case. And then, the assembly fixture is separated from the turbine case by means of releasing the hooked state of each inner lock piece and the hooked state of each outer lock piece, respectively.

SUMMARY OF THE INVENTION

The inner platform has the flange portion at its back end so as to hold the hooked state of the inner lock piece stable while the turbine nozzle assembly is loaded on a assembly fixture, however, the hooked state of the outer lock piece may turn extremely unstable while the turbine nozzle is also loaded on the assembly fixture in the case where the outer platform is configured to be approximately parallel to the engine center line (engine axis). Therefore, in such a case, the nozzle segments are liable to displace from the assembly fixture resulting in a problem that, for example, fitting the forward hook of the nozzle segment in the nozzle support hook of the turbine case is so difficult that a fixing operation will become laborious.

According to a technical aspect of the present invention, a turbine nozzle segment of a turbine nozzle assembly to be installed onto the back of a turbine case of an aircraft engine comprises a plurality of stator vanes, an arc-like inner band integrally molded at the inner end of a plurality of the stator vanes, an arc-like outer band integrally molded at the outer end of a plurality of the stator vanes, an inner platform formed in the inner band which has a flange portion protruding inward at a back end thereof and an inner flow-path face on an outer side thereof, an inner leg formed on the inner side of the inner platform of the inner band having an arc-like seal support at inner end thereof, an outer platform formed in the outer band having an outer flow-path face on inner side thereof, a forward outer leg formed on the outer side of the outer platform of the outer band having at an inner end thereof an forward hook being able to fit in an nozzle support hook of the turbine case, a aft outer leg formed at the back of the forward outer leg on the outer side of the outer platform, and a hook member formed at the circumferentially central portion of the back end of the outer platform, wherein an outer lock piece of a assembly fixture for installing the turbine nozzle onto the turbine case can be hooked on the hook member.

According to another aspect of the present invention, also a back surface of the aft outer leg (23s) is configured so as to increase backward gradually in a radius of its arc, and the front surface of the hook member is configured so as to be opposite to the back surface of the aft outer leg.

According to still another aspect of the present invention, the front surface of the hook member is approximately parallel to the back surface of the aft outer leg.

DESCRIPTION OF THE PREFERRED EMBODIMENT

Figure 1:
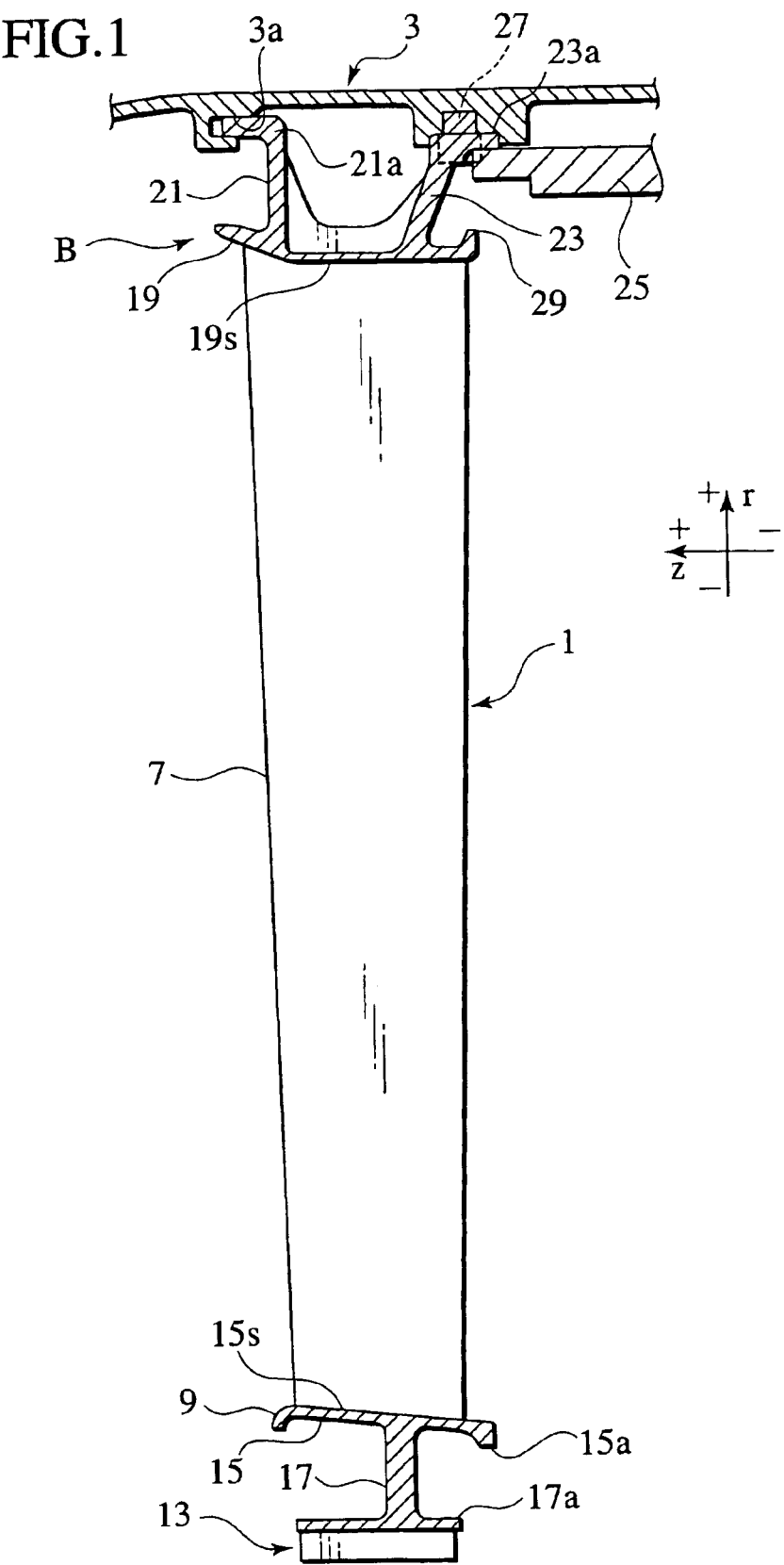
FIG. 1 is a side view of a turbine nozzle segment according to an embodiment of the present invention.
Figure 2:
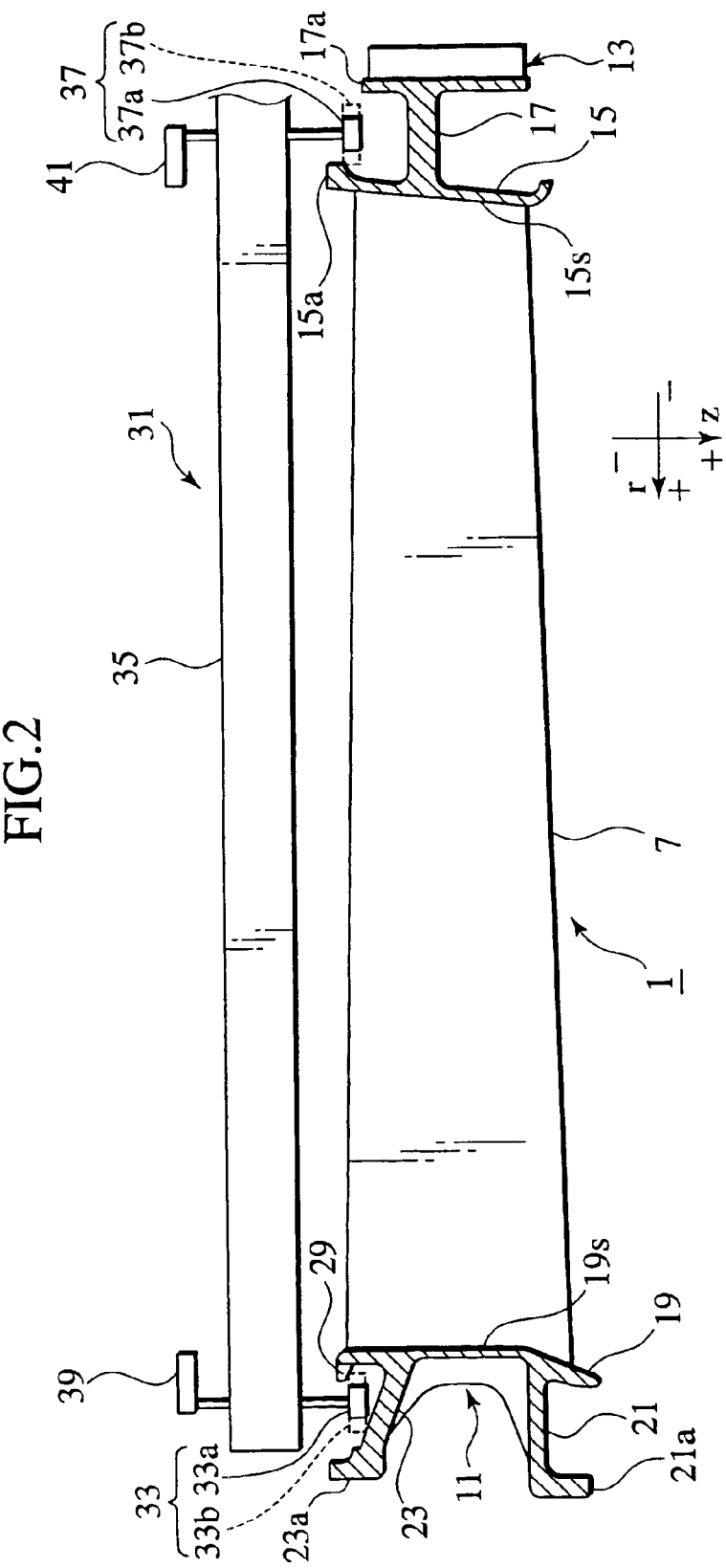
FIG. 2 is an enlarged view of the portion A in FIG. 6.

In the following, an embodiment of the present invention will be described referring to FIG. 1-FIG. 5. FIG. 1 is a side view of a turbine nozzle segment according to an embodiment of the present invention and shows the turbine nozzle segment installed onto a turbine case of an aircraft engine. FIG. 2 is an enlarged view of the portion A in FIG. 6, FIG.

Figure 4:
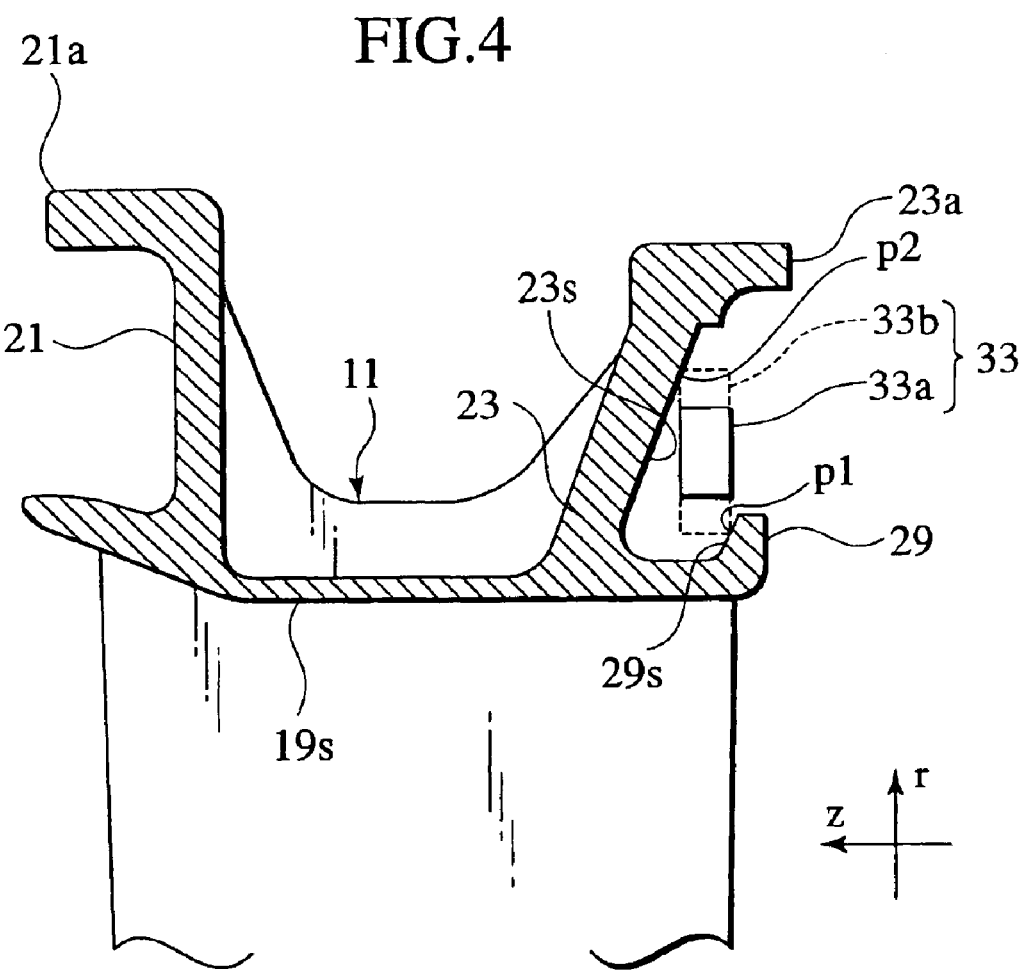
FIG. 4 is an enlarged view of the portion B in FIG. 1.
Figure 5:
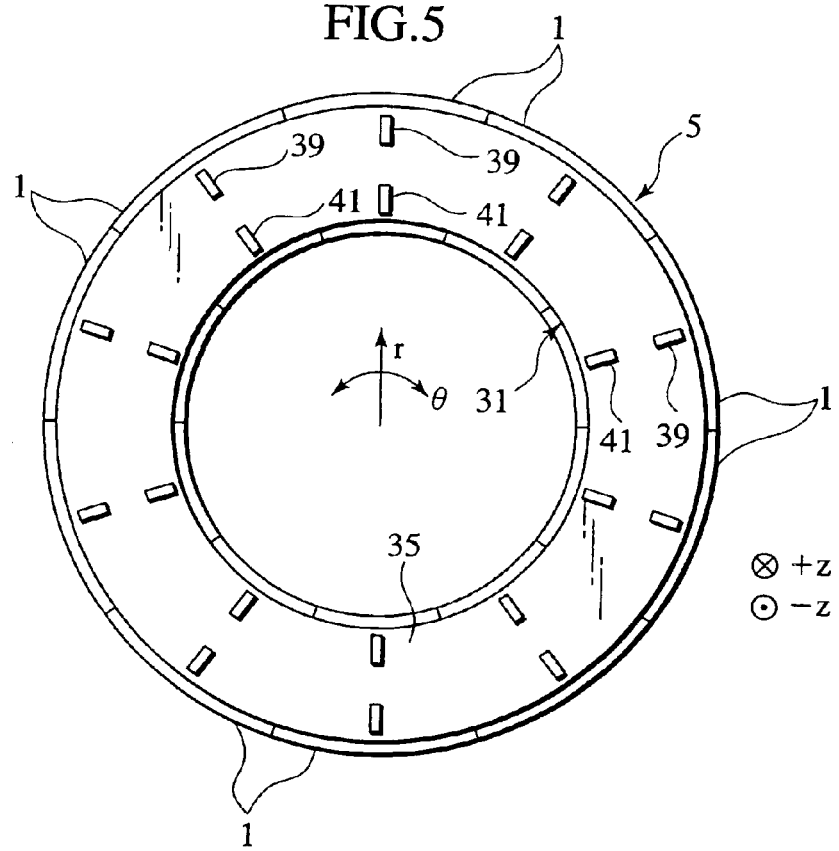
FIG. 5 is a schematic view showing a state where the turbine nozzle segment according to the embodiment of the present invention has been loaded on a assembly fixture.
Figure 6:
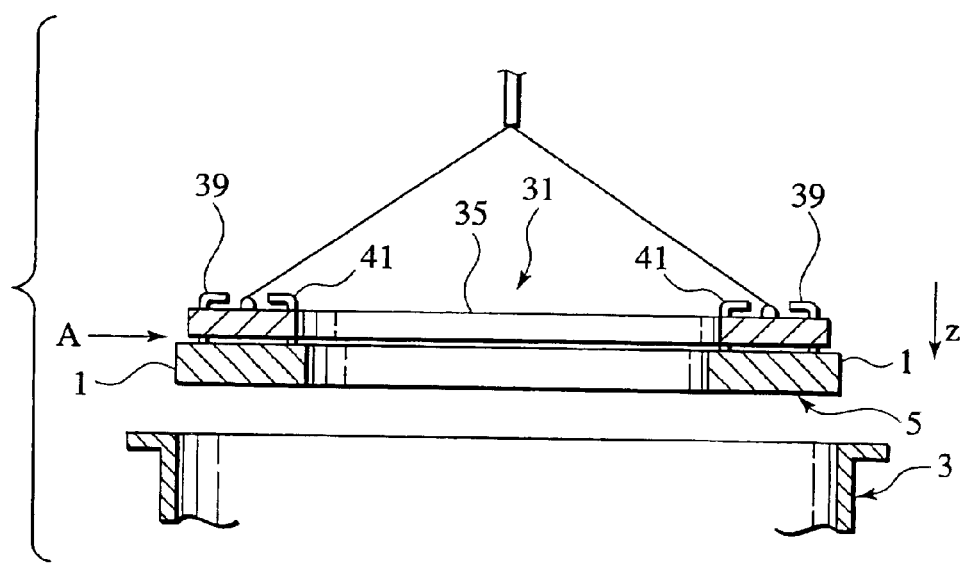
FIG. 6 is a schematic view illustrating an installation operation of the turbine nozzle segment according to the embodiment of the present invention.

3 is a rear view of the turbine nozzle segment according to the embodiment of the present invention, FIG. 4 is an enlarged view of the portion B in FIG. 1, FIG. 5 is a schematic view showing a state where the turbine nozzle segment according to the embodiment of the present invention has been loaded on a assembly fixture, and FIG. 6 is a schematic view illustrating an installation operation of the turbine nozzle segment according to the embodiment of the present invention.

Figure 3:
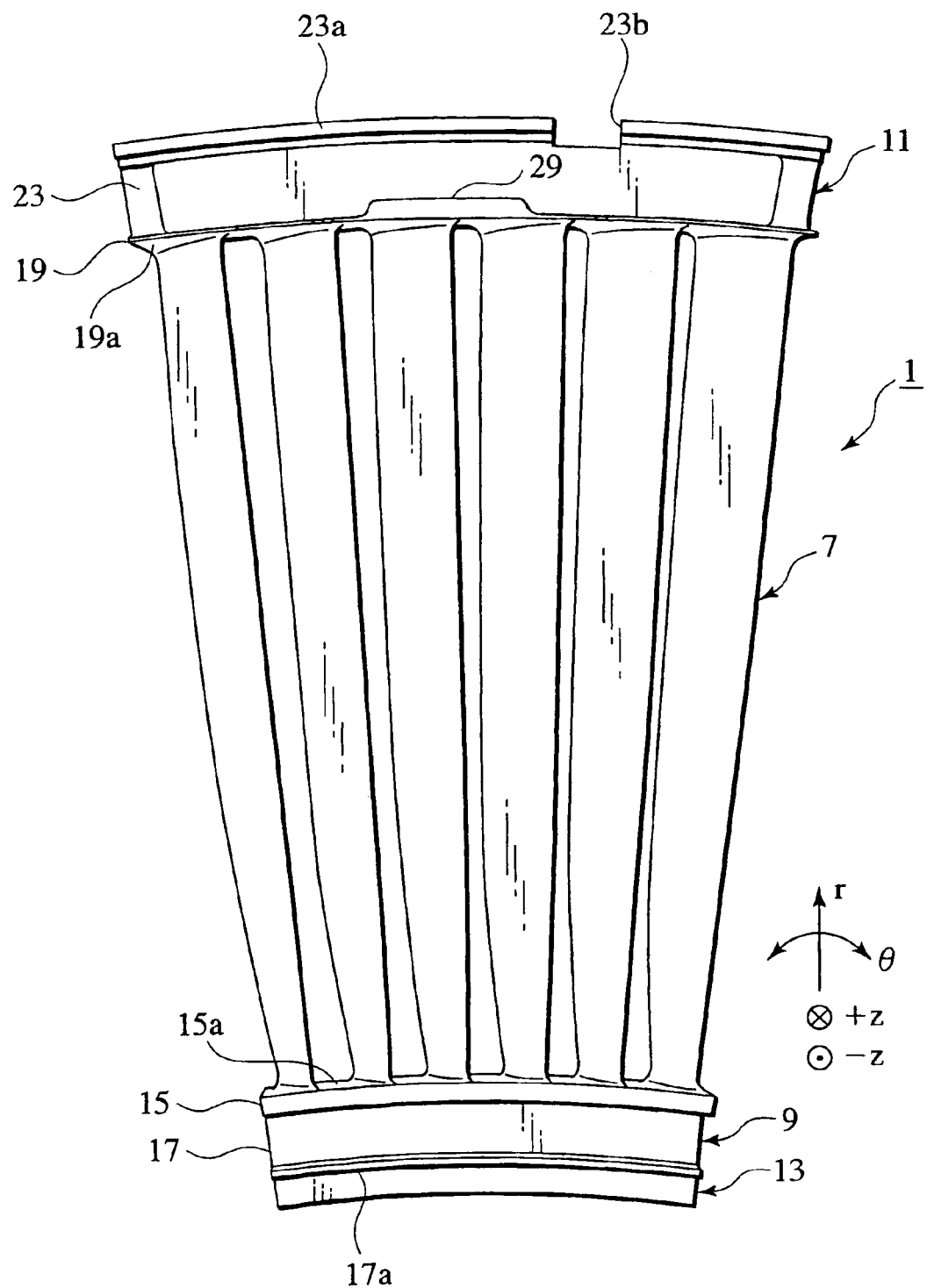
FIG. 3 is a rear view of the turbine nozzle segment according to the embodiment of the present invention.

Terms "front" and "back or rear" refer to being on/toward the left hand side (+z direction) and on/toward the right hand side (−z direction) respectively in FIGS. 1 and 4, downward (+z direction) and upward (−z direction) respectively in FIGS. 2 and 6, and being on/toward this side (+z direction) and on/toward the far side (−z direction) of the plane of the drawings in FIG. 3 and FIG. 5. A Term "inner" refers to a downward (−r direction) in FIGS. 1, 3, and 4, and to being on/toward the right hand side (−r direction) in FIG. 2. A term "outer" refers to an upward (+r direction) in FIGS. 1, 3, and 4, and to being on/toward the left hand side (+r direction) in FIG. 2.

As shown in FIGS. 1, 3 and 5, a turbine nozzle segment 1 according to an embodiment of the present invention, which is a segment composing part of a turbine nozzle assembly 5 to be installed onto the back of a turbine case 3, comprises a plurality of stator vanes 7, an arc-like inner band 9 integrally molded at the inner (−r direction) end of a plurality of the stator vanes, an arc-like outer band 11 integrally molded at the outer (+r direction) end of a plurality of the stator vanes, and a seal member 13 with a honeycomb structure provided by brazing on the inner end of the inner band 9. It should be noted that the number of the turbine nozzle segments 1 composing the turbine nozzle assembly 5 as shown in FIG. 5 is only for illustration and is usually larger than that illustrated in the figure.

The concrete constitution of the inner band 9 is described as follows. As shown in FIG. 1 and FIG. 3, an inner platform 15 is formed at the inner end of a plurality of the stator vanes 7, and the inner platform 15 has an inner flow-path face 15s on its outer side, and the inner platform 15 also has a flange portion 15a protruding inward at its back end. And there, the inner platform 15 is configured so as to extend inward (−r direction) toward its back side (−z direction) in the engine axis. In other words, the engine axis is the direction of the engine axle of the stator vanes and that is in the left and right direction (in the direction of z-axis) in FIG. 1 and is in the upward and downward direction (in the direction of z-axis) in FIG. 2. An inner leg 17 is formed on the inner side of the inner platform 15, and the inner leg 17 has a seal support 17a at its inner end.

As shown in FIG. 1 to FIG. 4, an outer platform 19 is formed at the outer end of a plurality of the stator vanes 7, and the outer platform 19 has an outer flow-path face 19s on its inner side. The outer flow-path face 19s of the outer platform 19 is configured so as to be substantially parallel to the engine axis (in the direction of z-axis).

A forward outer leg 21 is formed on the outer side of the outer platform 19, and the forward outer leg 21 has, at its front end, a forward hook 21a able to fit in an nozzle support hook 3a of the turbine case 3. A aft outer leg 23 is formed at the back (−z direction) of the forward outer leg 21 on the outer side of the outer platform 19, and the aft outer leg has a aft hook 23a being held by a rear shroud segment 25 at its front (+r direction) end portion. A anti-rotation slot 23b being able to link with a anti-rotation pin 27 is formed in a part of the aft hook 23a of the aft outer leg 23, and the nozzle segment 1 is held so as not to turn and move by the anti-rotation pin 27. The back surface 23s of the aft outer leg 23 is configured so as to increase backward (−z direction) gradually in a radius of its arc.

A hook member 29 is formed at the back end and also in the circumferentially (in the θ direction) central portion of the outer platform 19. An outer lock piece 33 of a assembly fixture 31 for installing the turbine nozzle assembly 5 onto the turbine case 3 can be hooked on the hook member 29. A front surface 29s of the hook member 29 is configured so as to be approximately parallel and opposite to the back surface 23s of the aft outer leg 23. The front surface 29s is configured so as to extend outward (+r direction) toward its backside (−z direction) in the engine axis (in the direction of z-axis). That is to say, the front surface 29s of the hook member 29 is configured so as to increase backward (−z direction) gradually in a radius of its arc. In FIG. 4, for example, the back surface 23s of the aft outer leg 23 and the front surface 29s of the hook member 29 are illustrated as slopes parallel with each other.

A length m of the hook member 29 in the circumferential direction is configured to be 0.15 times larger than or equal to and also 0.3 times smaller or equal to a length M of the outer platform 19 in the circumferential direction (in the θ direction). This relationship is expressed as $0.15M \leq m \leq 0.3M$.

A height h of the hook member 29 is configured to be in a range of 0.1 times larger than or equal to and 0.25 times smaller than or equal to a height H between the outer platform 19 and the aft hook 23a of the aft outer leg 23. This relationship is expressed as $0.15H \leq h \leq 0.3H$.

As shown in FIG. 5 and FIG. 6, a assembly fixture 31 includes a fixture base 35, and the outer lock pieces 33, which have the same number as that of the turbine nozzle segments 1, are provided at an equal spacing circumferentially (in the θ direction) along the outer periphery of the jig base 35, and inner lock pieces 37, which have the same number as that of the turbine nozzle segments 1, are provided at an equal spacing circumferentially (in the θ direction) along the inner periphery of the jig base. Each of the outer lock pieces can be articulated by operating an outer lever 39 and each of the inner lock pieces 37 can also be articulated by operating an inner lever 41.

When the turbine nozzle assembly 5 composing a plurality of the turbine nozzle segments 1 with the above constitution is installed onto the back of the turbine case 3, the following operation will be performed using the assembly fixture 31. At first, a plurality of the turbine nozzle segments 1 are disposed in a circle using a disposition jig (omitted in the figure). Thereby, the turbine nozzle assembly 5 can be assembled with a plurality of the turbine nozzle segments 1.

In the next, as shown in FIG. 2 and FIG. 5, each inner lock piece 37 of the assembly fixture 31 is inserted between the inner platform 15 and the seal support 17a of the turbine nozzle segment 1 corresponding thereto, and each inner lock piece 37 is articulated by operating the inner lever 41 to be hooked on the flange portion 15a corresponding thereto of the turbine nozzle assembly segment 1. In a similar manner, each outer lock piece 33 of the assembly fixture 31 is inserted (33a) between the outer platform 19 and the aft outer leg 23 of the turbine nozzle segment 1 corresponding thereto, and each outer lock piece 33 is articulated by operating the outer lever 39 to be hooked (33b) on the hook member 29 corresponding thereto of the turbine nozzle segment 1. Thereby, the turbine nozzle assembly 5 can be temporarily loaded on the assembly fixture 31.

Since the turbine nozzle segment 1 has the flange on the inner platform 15 and the hook member on outer platform 19, the turbine nozzle assembly can be loaded on the nozzle assembly fixture 31 stably by the outer lock piece 33 and the inner lock piece 37.

Since the front surface 29s of the hook member 29 is configured so as to be substantially parallel and opposite to the back surface 23s of the aft outer leg 23, at least a part p2 of the back surface 23s of the aft outer leg 23 and at least a part p1 of the front surface 29s of the hook member 29 can be locally pressed to nearly opposite directions by inserting and turning the outer lock piece 33 in between the outer platform 19 and the aft outer leg 23. Consequently, the hooked state of the outer lock piece 33 can be made stable, even though the length of the hook member 29 in the circumferential direction is not so long and the height of the hook member 29 is not so high. Further, the position and direction of the turbine nozzle segments 1 can be stabilized by means of restraining the radial (in the r-axis direction) displacement of the turbine nozzle segments 1.

Moreover, since the length m of the hook member 29 in the circumferential direction is configured to be larger than or equal to 0.15 M and also smaller or equal to 0.3 M and the height h of the hook member 29 is configured to be larger than or equal to 0.1H and also smaller or equal to 0.25H, the hooked state of the outer lock piece 33 can be made more stable by means of further restraining the circumferential length and the height of the hook member 29.

Then, as shown in FIG. 1 and FIG. 6, by means of letting the assembly fixture 31 reach the turbine case 3 from its backside (in the −z direction), the forward hook 21a of the forward outer leg 21 of each turbine nozzle segment 1 is fit into the nozzle support hook 3a of the turbine case 3. Further, the assembly fixture 31 is separated from the turbine case 3 by means of releasing the hooked state of each inner lock piece 37 and the hooked state of each outer lock piece 33 respectively, after having linked the anti-rotation slot 23b in the aft hook 23a of the aft outer leg 23 of each turbine nozzle segment 1 to the anti-rotation pin 27. Finally, the aft hook 23a of the aft outer leg 23 is held with the rear shroud segment 25 and the turbine case 3.

According to the embodiment of the present invention as described above, since the hooked state of the inner lock piece 37 and the hooked state of the outer lock piece 33 can be made stable while the turbine nozzle assembly 5 is loaded on the assembly fixture 31, the operation efficiency of installing the turbine nozzle assembly 5 can be enhanced by means of restraining the displacement of the turbine nozzle segments 1 relative to the assembly fixture 31 even in such a case where the outer platform 19 is configured to be approximately parallel to the engine axis (in the z-axis direction).

Since the hooked state of the outer lock piece 33 can be made stable while the turbine nozzle assembly 5 is loaded on the assembly fixture 31 even though the length of the hook member 29 in the circumferential direction is not so long and the height of the hook member 29 is not so high, the weight of the turbine nozzle segment 1 can be lessened because there will be no need to lengthen either the hook member 29 in the circumferential direction or to lengthen the hook member 29 in an upward direction.

Particularly, since the hooked state of the outer lock piece 33 can be made more stable while the turbine nozzle assembly 5 is loaded on the assembly fixture 31 in a case where the circumferential length or the height of the hook member 29 is restrained, the operation efficiency of installing the turbine nozzle assembly 5 can be still more enhanced as well as lessening the weight of the turbine nozzle segments 1.

The present invention should not be limited to the description of the above embodiment of the invention but it can be applicable in various modes by making the appropriate conversion thereof.

Effect of the Invention

According to the present invention, since the hooked state of the inner lock piece and the hooked state of the outer lock piece can be made stable while the turbine nozzle is loaded on the assembly fixture, the operation efficiency of installing the turbine nozzle can be enhanced by means of restraining the rickety state of the turbine nozzle segments 1 relative to the assembly fixture 31 even though the outer platform 19 has been configured to be approximately parallel to the direction of the vane width.

Further, according to a technical aspect of the present invention, since the hooked state of the outer lock piece can be made stable even though the circumferential length of the hook member is not so long or the height of the hook member is not so high, lessening the weight of the turbine nozzle segments 1 can be promoted because there will be no need to lengthen the circumferential length of the hook member or to lengthen the hook member in an upward direction.

According to another technical aspect of the present invention, since the hooked state of the outer lock piece can be made more stable by further restraining the circumferential length and the height of the hook member, the operation efficiency of installing the turbine nozzle can be still further enhanced, as well as the weight of the turbine nozzle segments 1 being lessened.

Although the invention has been described above by reference to certain embodiments of the invention, the invention is not limited to the embodiments described above. Modifications and variations of the embodiments described above will occur to those skilled in the art, in light of the teachings. Entire contents of Japanese Patent Applications No. 2003-123923, filed on Apr. 28, 2003 are incorporated by reference herein. The scope of the invention is defined with reference to the following claims.

What is claimed is:

1. A turbine nozzle segment of a turbine nozzle assembly to be installed onto a back of a turbine case of an aircraft engine, comprising:

a plurality of stator vanes;

an arc-like inner band being integrally molded at the inner end of a plurality of the stator vanes;

an arc-like outer band being integrally molded at the outer end of a plurality of the stator vanes;

an inner platform being formed in the inner band, the inner platform having a flange portion protruding inward at a back end thereof and an inner flow-path face on the outer side thereof;

an inner leg being formed on the inner side of the inner platform of the inner band, the inner leg having an arc-like seal support at the inner end thereof;

an outer platform being formed in the outer band, the outer platform having an outer flow-path face on the inner side thereof;

a forward outer leg being formed on the outer side of the outer platform of the outer band, the forward outer leg having a forward hook being able to fit into an nozzle support hook of the turbine case at the inner end of the forward outer leg;

a aft outer leg being formed at the back of the forward outer leg on the outer side of the outer platform; and a hook member being formed at the circumferentially central portion of the back end of the outer platform, wherein an outer lock piece of a assembly fixture for installing the turbine nozzle assembly onto the turbine case can be hooked onto the hook member.

2. The turbine nozzle segment of claim 1, wherein a back surface of the aft outer leg is configured so as to increase backward gradually in a radius of its arc; and a front surface of the hook member is configured so as to be opposite to the back surface of the aft outer leg.

3. The turbine nozzle segment of claim 2, wherein the front surface of the hook member is substantially parallel to the back surface of the aft outer leg.

4. The turbine nozzle segment of claim 1, wherein the back surface of the aft outer leg is configured so that an area extending from a base end portion to a front end portion may increase backward gradually in a radius of its arc;

the front surface of the hook member is configured so as to be opposite to the back surface of the aft outer leg; and the front surface of the hook member is substantially parallel to the back surface of the aft outer leg.

5. The turbine nozzle segment of claim 1, wherein a length of the hook member in the circumferential direction is in a range of 0.15 times larger than or equal to and 0.3 times smaller than or equal to a length of the outer platform in the circumferential direction.

6. The turbine nozzle segment of claim 1, wherein a height of the hook member is 0.1 times larger than or equal to a difference in height between the outer platform and the front end portion of the aft outer leg and is 0.25 times smaller than or equal to the difference in height.

7. The turbine nozzle segment of claim 2, wherein a length of the hook member in the circumferential direction is in a range of 0.15 times larger than or equal to and 0.3 times smaller than or equal to a length of the outer platform in the circumferential direction.

8. The turbine nozzle segment of claim 2, wherein a height of the hook member is in a range of 0.1 times larger than or equal to and 0.25 times smaller than or equal to a difference in height between the outer platform and the front end portion of the aft outer leg.

* * * * *